W. S. Furlow,
Snap Hook,
No 67,746. Patented Aug. 13, 1867

Witnesses
Theo. Tusch
Wm Truan

Inventor:
W. S. Furlowe
Per Munn & Co
Attorneys

United States Patent Office.

WALTER S. FURLOW, OF GENESEO, ILLINOIS.

Letters Patent No. 67,746, dated August 13, 1867.

---

IMPROVEMENT IN SNAP-HOOK.

---

The Schedule referred to in these Letters Patent and making part of the same.

---

TO ALL WHOM IT MAY CONCERN:

Be it known that I, WALTER S. FURLOW, of Geneseo, in the county of Henry, and State of Illinois, have invented a new and useful Improvement in Snap-Hook; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved snap-hook, simple in construction, not liable to get out of order, not liable to freeze up in cold weather, and which can be manufactured at a small expense; and it consists in the combination of the parts of the hook made in the form herein shown and described, and the rubber ring or band, with each other, as hereinafter more fully described.

Figure 1:
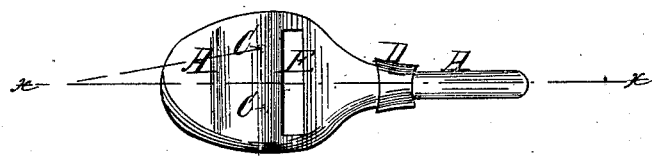
Figure 1 is a side view of my improved snap-hook.
Figure 2:
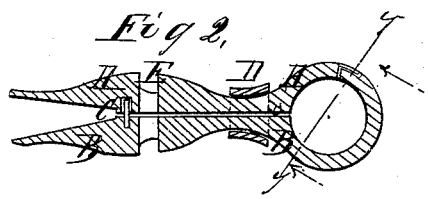
Figure 2 is a longitudinal section of the same taken through the line $x\ x$, fig. 1.
Figure 3:
Figure 3 is a detail sectional view of the same taken through the line $y\ y$, fig. 2.

A and B are the main parts of the body of the hook, the rear ends of which are made broad, and are bevelled off upon their inner sides, as shown in fig. 2, so that the hook may be opened by pressing the said ends together. The parts A and B are kept in their proper relative positions by dowel-pins C attached to the inner side of the one part, and entering holes in the other part, as shown in fig. 2. The pins C form the pivots upon which the parts of the hook move in opening and closing. The forward end or hook of the one part is made longer than that of the other part, so that the opening may be at one side, and it has a semicircular tenon formed upon its end, which fits into a semicircular recess formed in the end of the other part, as shown in figs. 2 and 3. The parts A and B are held together or locked by the rubber ring or band D passed around the shank of the said parts, as shown in figs. 1 and 2. E is a slot formed through the body of the parts A and B, in front of the dowel or pivoting-pin C, through which is passed the strap to which the snap-hook is attached.

I claim as new, and desire to secure by Letters Patent—

An improved snap-hook, formed by the combination of the parts A and B, constructed substantially as herein shown and described, and rubber or equivalent band D, with each other, as and for the purpose set forth.

The above specification of my invention signed by me this 6th day of May, 1867.

WALTER S. FURLOW.

Witnesses:
 WALTER THOMAS,
 J. C. ROCKWELL.